United States Patent [19]
Nakamura

[11] Patent Number: 6,007,423
[45] Date of Patent: Dec. 28, 1999

[54] VIRTUAL COURSE DISPLAY METHOD AND GAME MACHINE USING THE SAME

[75] Inventor: Atsuhiko Nakamura, Tokyo, Japan

[73] Assignee: Sega Enterprises, Ltd., Tokyo, Japan

[21] Appl. No.: 08/747,596

[22] Filed: Nov. 12, 1996

[30] Foreign Application Priority Data

Nov. 13, 1995 [JP] Japan .................................. 7-294022

[51] Int. Cl.⁶ .................................................. A63F 71/00
[52] U.S. Cl. ............................................... 463/6; 273/461
[58] Field of Search .................................. 463/6, 58, 59; 273/138.1, 138.2, 139, 237, 246, 459, 460, 461

[56] References Cited

U.S. PATENT DOCUMENTS

5,269,687  12/1993  Mott et al. .................................. 463/6

Primary Examiner—Valencia Martin-Wallace
Assistant Examiner—John Paradiso
Attorney, Agent, or Firm—Dickstein Shapiro Morin & Oshinsky LLP

[57] ABSTRACT

The present invention relates to a virtual course display method of displaying on display means a virtual course, which is constructed by connecting a plurality of virtual course parts and where a virtual mobile body runs, the method comprising the steps of: randomly selecting a predetermined number of successively connectable virtual course parts data from among plural pieces of virtual course parts data having different shapes and each being connectable to at least one of other virtual course parts data; storing at least a connecting order of the selected predetermined number of virtual course parts data; constructing a virtual course including virtual course parts data a mobile body passes and a predetermined number of virtual course parts data following the former virtual course parts data based on the connecting order; generating an image of the virtual course; and displaying the image of the virtual course on the display means. The present invention also relates to a game machine and storage medium for the above method.

7 Claims, 9 Drawing Sheets

GAME FLOWCHART

FIG. 1

EXAMPLE OF GAME MACHINE STRUCTURE

FIG. 2
BLOCK DIAGRAM OF GAME MACHINE

FIG. 3

GAME FLOWCHART

FIG. 4

COURSE PARTS AND COURSE LAYOUT

FIG. 5

DATA STRUCTURE FOR A COURSE PART

FIG. 6

DATA STRUCTURE OF A COURSE PART

BN course part:

A : (($X_{a1}$, $Y_{a1}$, $Z_{a1}$), ($X_{a2}$, $Y_{a2}$, $Z_{a2}$), ($X_{a3}$, $Y_{a3}$, $Z_{a3}$), ($X_{a4}$, $Y_{a4}$, $Z_{a4}$), T1)
B : (($X_{b1}$, $Y_{b1}$, $Z_{b1}$), ($X_{b2}$, $Y_{b2}$, $Z_{b2}$), ($X_{b3}$, $Y_{b3}$, $Z_{b3}$), ($X_{b4}$, $Y_{b4}$, $Z_{b4}$), T2)
C : (($X_{c1}$, $Y_{c1}$, $Z_{c1}$), ($X_{c2}$, $Y_{c2}$, $Z_{c2}$), ($X_{c3}$, $Y_{c3}$, $Z_{c3}$), ($X_{c4}$, $Y_{c4}$, $Z_{c4}$), T3)
D : (($X_{d1}$, $Y_{d1}$, $Z_{d1}$), ($X_{d2}$, $Y_{d2}$, $Z_{d2}$), ($X_{d3}$, $Y_{d3}$, $Z_{d3}$), ($X_{d4}$, $Y_{d4}$, $Z_{d4}$), T2)
E : (($X_{e1}$, $Y_{e1}$, $Z_{e1}$), ($X_{e2}$, $Y_{e2}$, $Z_{e2}$), ($X_{e3}$, $Y_{e3}$, $Z_{e3}$), ($X_{e4}$, $Y_{e4}$, $Z_{e4}$), T1)

FIG. 7 CONNECTION OF COURSE PARTS

FIG. 8
COURSE PART EXAMPLES

FIG. 9

TABLE FOR RANDOM SELECTION

|     | (1)           | (2)           | (3)           | (4)           | (5)           | (6)           | (7)           | (8)           |
|-----|---------------|---------------|---------------|---------------|---------------|---------------|---------------|---------------|
| (1) | $\frac{2}{8}$ | $\frac{1}{8}$ | —             | $\frac{2}{8}$ | —             | —             | $\frac{3}{8}$ | $\frac{2}{8}$ |
| (2) | —             | —             | $\frac{2}{8}$ | —             | $\frac{2}{8}$ | $\frac{4}{8}$ | —             | —             |
| (3) | —             | —             | —             | —             | $\frac{5}{8}$ | $\frac{3}{8}$ | —             | —             |
| (4) | $\frac{4}{8}$ | $\frac{1}{8}$ | —             | —             | —             | —             | $\frac{2}{8}$ | $\frac{1}{8}$ |
| (5) | $\frac{3}{8}$ | $\frac{1}{8}$ | —             | $\frac{1}{8}$ | —             | —             | $\frac{2}{8}$ | $\frac{1}{8}$ |
| (6) | —             | —             | $\frac{1}{8}$ | —             | $\frac{4}{8}$ | $\frac{3}{8}$ | —             | —             |
| (7) | $\frac{2}{8}$ | $\frac{2}{8}$ | —             | $\frac{1}{8}$ | —             | —             | $\frac{2}{8}$ | $\frac{1}{8}$ |
| (8) | $\frac{2}{8}$ | $\frac{2}{8}$ | —             | $\frac{1}{8}$ | —             | —             | $\frac{1}{8}$ | $\frac{2}{8}$ |

VIRTUAL COURSE DISPLAY METHOD AND GAME MACHINE USING THE SAME

BACKGROUND OF THE INVENTION

1. Field of the Invention

The present invention relates to a game for driving mobile bodies like cars using a computer system, and, more particularly, to a virtual course display method which permits a player to drive a mobile body on a random drive course.

2. Description of the Related Art

Conventionally, various kinds of game machines for car races which use a computer system have been developed and put to a practical use for arcade games, home usage and the like.

For those car racing game machines, a virtual course (hereinafter simply referred to as a course) on which cars run is previously prepared as a game's initial value, so that each player should drive on the same course every time. In a better case, a plurality of drive courses are registered as initial values so that the player can merely select the desired course according to the skill or preference. In this case, those drive courses are fixed too.

For games which permit players to drive cars on a predetermined course several laps as in the ordinary car races, players may tolerate driving on a fixed course over and over again. In the case of a car rally, however, players would probably enjoy driving an unexpected course. If a rally is repeated on the same course, players cannot feel like participating a real rally.

Even with the games in which players just drive cars on a predetermined course a few laps as in the ordinary car races, the players would get easily bored with the course layout after driving the course repeatedly and would lose excitement in playing the games.

One solution to this situation is to provide as many drive courses as possible as initial values or to allow optional drive courses to be added. Playing such a game over and over again, however, the excitement of players playing such a game diminishes. Moreover, the preparation of many drive courses for game machines using a computer system requires a large memory area, which sacrifices the expansion capability of the machines.

SUMMARY OF THE INVENTION

Accordingly, it is an object of the present invention to provide a virtual course display method which allows a player to drive on a random course constructed every time a game is played or the player's car runs on a course, a game machine which uses this method, and a storage medium having stored programs which accomplish the method.

To achieve this object, according to the first aspect of this invention, there is provided a virtual course display method of displaying on display means a virtual course, which is constructed by connecting a plurality of virtual course parts and where a virtual mobile body runs, the method comprising the steps of:

randomly selecting a predetermined number of successively connectable virtual course parts data from among plural pieces of virtual course parts data having different shapes and each being connectable to at least one of other virtual course parts data;

storing at least a connecting order of the selected predetermined number of virtual course parts data;

constructing a virtual course including virtual course parts data a mobile body passes and a predetermined number of virtual course parts data following the former virtual course parts data based on the connecting order;

generating an image of the virtual course; and displaying the image of the virtual course on the display means.

According to the first aspect of this invention, the virtual course display method further comprises a step of randomly selecting a virtual course part datum from among a plurality of virtual course parts data connectable to a last virtual course part during execution of a game program when the mobile body manipulatable by a player reaches a point in a virtual course located away from the last virtual course part by a predetermined number of virtual course parts, and connecting the selected virtual course part to the last virtual course part to update the virtual course.

To achieve this object, according to the second aspect of this invention, there is provided a game machine for executing a game program, stored in a storage medium, for driving a virtual mobile body in accordance with an operation signal generated by a player and supplying an image signal to a display section for displaying a game scene, the game machine comprising:

a storage medium storing plural pieces of virtual course parts data having different shapes in such a manner that one virtual course part is connectable to a predetermined number of other virtual course parts in shape; and control means for randomly selecting a predetermined number of virtual course parts data connectable to one another, storing at least a connecting order of the selected predetermined number of virtual course parts data, connecting the selected virtual course parts data based on the connecting order to construct a virtual course, and executing the game program while supplying an image signal for displaying an image of the virtual course to the display section in accordance with the virtual course.

According to the second aspect of this invention, the control means randomly select a virtual course part datum from among a plurality of virtual course parts data connectable to a last virtual course part during execution of the game program when the mobile body manipulatable by the player reaches a point of a predetermined number of virtual course parts away from (before) the last virtual course part in a virtual course, and connect the selected virtual course parts to the last virtual course part to update the virtual course.

To achieve this object, according to the third aspect of this invention, there is provided a storage medium having stored a game program for driving a virtual mobile body and connectable to a game machine for executing the game program for driving the virtual mobile body in accordance with an operation signal generated by a player and supplying an image signal to a display section for displaying a game scene, the storage medium including:

plural pieces of virtual course parts data having different shapes in such a manner that one virtual course part is connectable to a predetermined number of other virtual course parts;

a program code for a step of randomly selecting a predetermined number of virtual course parts data connectable to one another;

a program code for a step of storing at least a connecting order of the selected predetermined number of virtual course parts data;

a program code for a step of connecting the selected virtual course parts data based on the connecting order to construct a virtual course; and a program code for a step of executing the game program while displaying an image of the virtual course on the display section in accordance with data of the virtual course.

According to the third aspect of this invention, the storage medium has further stored a program code for a step of randomly selecting a virtual course part datum from among a plurality of virtual course parts data connectable to a last virtual course part during execution of the game program when the mobile body manipulatable by the player reaches a point of a predetermined number of virtual course parts away from the last virtual course part in the virtual course, and connecting the selected virtual course part to the last virtual course part to update the virtual course.

According to the previously recited storage medium, each of the virtual course parts data has plural pieces of data of polygons and texture data of surfaces of the polygons, and the polygons of the mutually connectable virtual course parts data at connecting portions have same shapes or complementary shapes and have same texture.

The expression "randomly selecting" includes random selection under a given restriction or a given rule. The "random selection" may therefore include random selection with a predetermined probability set for each virtual course parts data.

DETAILED DESCRIPTION OF THE PREFERRED EMBODIMENT

A preferred embodiment of the present invention will now be described with reference to the accompanying drawings.

Structure of Game Machine

Figure 1:
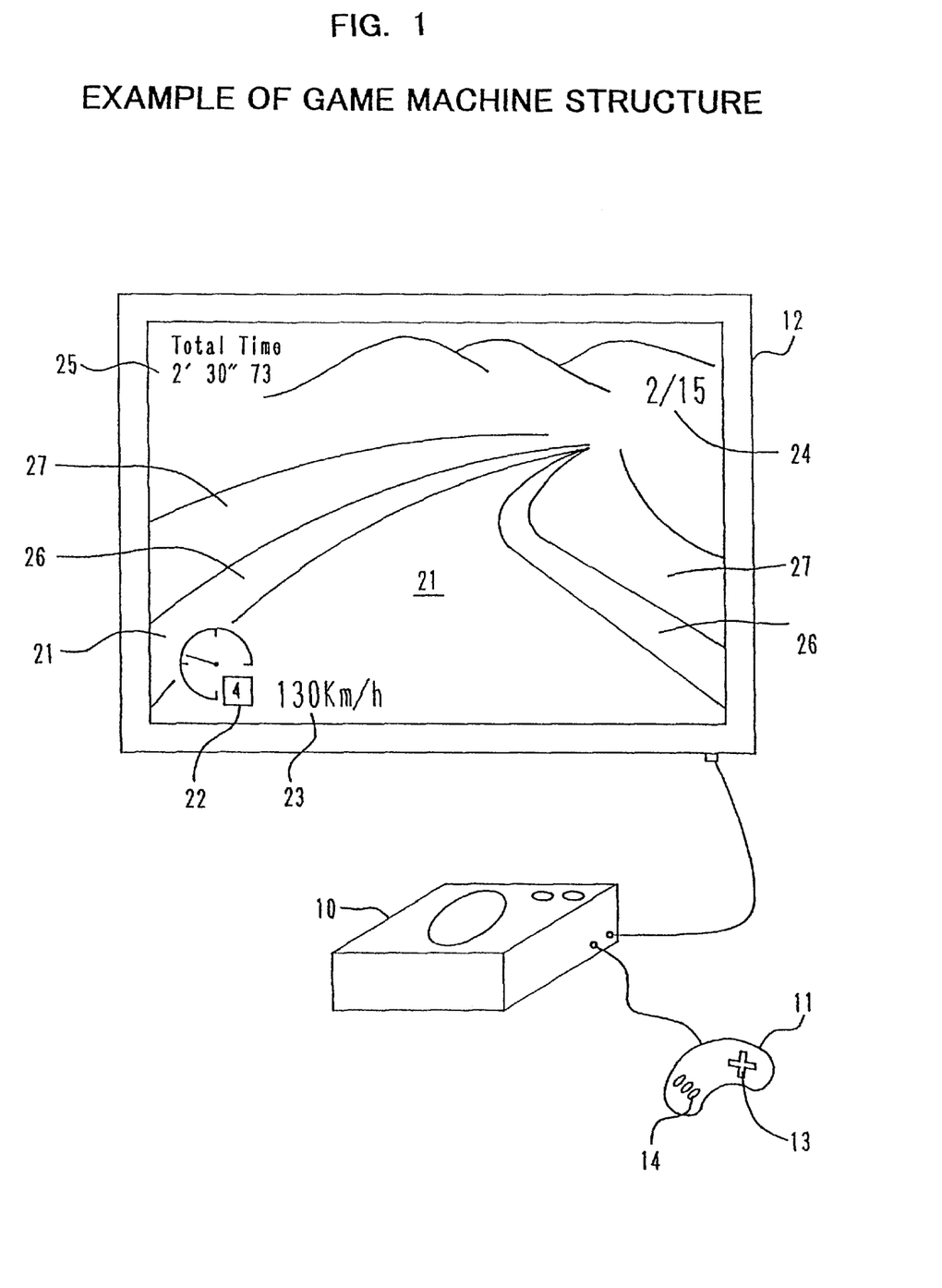
FIG. 1 is a diagram exemplifying the structure of a game machine according to one embodiment of this invention.

FIG. 1 illustrates the basic structure of a game machine and an example of a basic display image. The basic structure comprises a main body 10 for executing game software into which a game cartridge or a compact disk ROM (CDROM) having stored game software is loaded, an input operation section 11, which is connected to the main body 10 via a cable or radio, for inputting operations information on the acceleration, steering direction, braking, transmission, etc., and a display device 12 for displaying an image which is processed by the main body 10.

The operation section 11 has a four-direction input key 13 to input the steering direction, and various buttons 14. Depressing the buttons 14 inputs the operational information of the acceleration, braking and transmission.

The main body 10 has a structure similar to that of a computer system which is used for ordinary games, and incorporates a CPU or the like, which loads a program in, for example, a game cartridge or a compact disk and runs it.

According to this embodiment, as illustrated, a display image basically consists of the scene which is seen through the front glass when a player gets on a racing car and information necessary for a race. As illustrated, the display image has a course 20 at the center of the screen extending from the foreground, and has a tachometer 21, a display 22 showing the current shift position of the transmission and a display 23 showing the current speed, on the lower left of the screen. The display image further includes a position information display 24 on the upper right corner, which shows the number of cars in the race at the denominator and the position of the player's car at the numerator. Shown on the upper left corner of the screen are total time display 25 indicating the passing time of a game. As will be specifically discussed later, a course 20 is constructed for each game by randomly selecting and connecting plural pieces of course parts data. Course parts of predetermined lengths are connected to construct a single long course though it cannot be seen on the screen.

Figure 2:
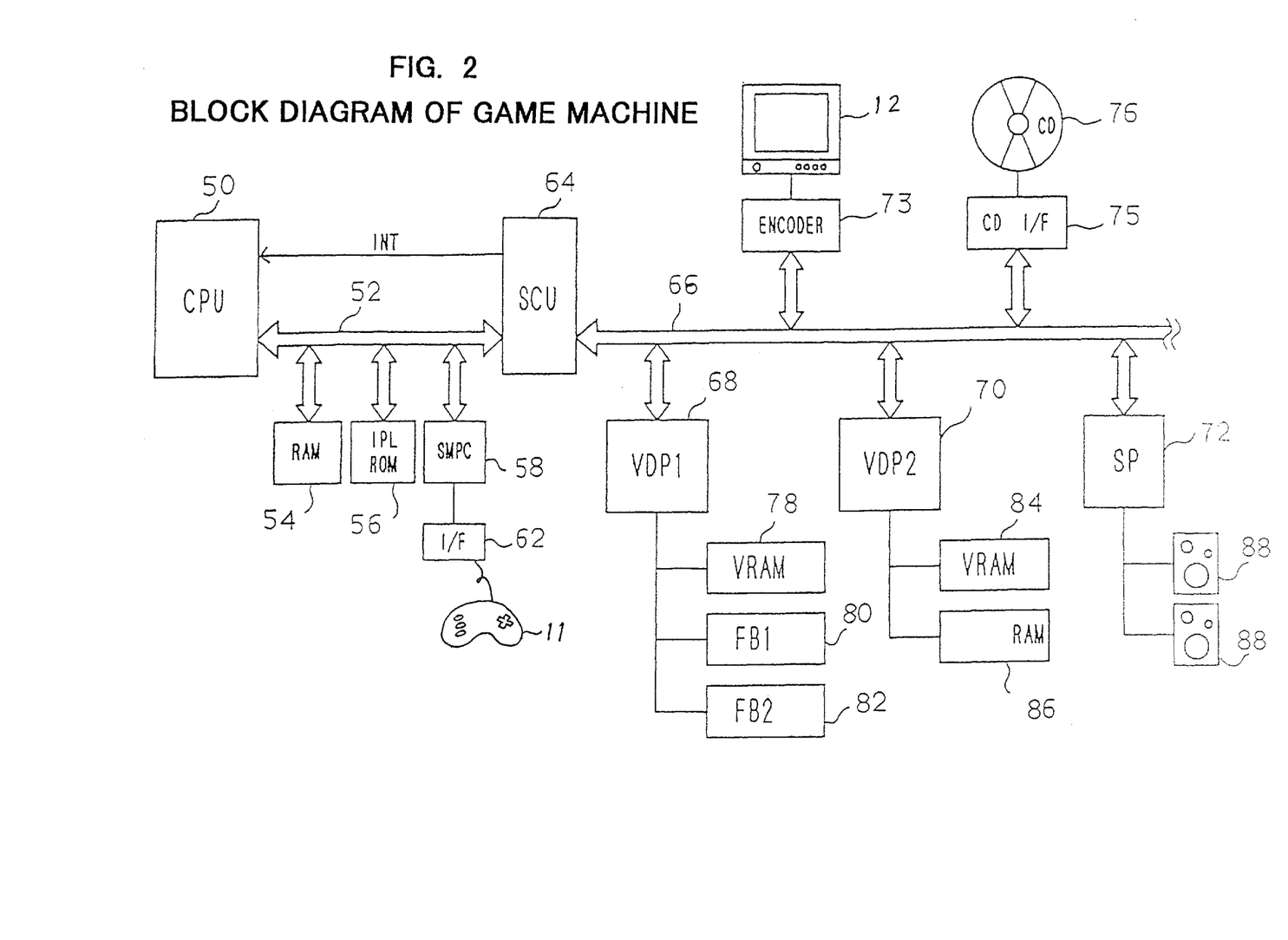
FIG. 2 is a block diagram of the game machine.

FIG. 2 is a block diagram for explaining an example of the basic structure of the main body 10. The main body 10 has the following schematic structure.

In FIG. 2, a main CPU 50 performs processing of a game and arithmetic operations for image processing or the like in accordance with a game program. The main CPU 50 is connected to a random access memory (RAM) 54 and a read only memory (ROM) 56. The RAM 54 provides a work memory area during arithmetic operations, and stores data acquired by arithmetic operations, a game program and course parts data, and image data of a course, cars and background, which are externally supplied. The ROM 56 stores a program (IPL) for executing initial program loading. Also connected to the CPU 52 is a system manager and peripheral controller 58, which controls the reset management of the entire system and the interface with an external device, such as the input operation section 11. Reference numeral "62" is an interface circuit.

A system control unit (SCU) 64 serves as a coprocessor of the CPU 50 and controls individual buses 52 and 66. The SCU 64 incorporates a direct memory access (DMA) controller which transfer display data to an image memory (VRAM) 78 during the operation of the main CPU 50.

A first video display processor (VDPL) 68, a second video display processor (VDP2) 70, a sound processor 72, the display device 12, and a CDROM (Compact Disk ROM) 76 are connected to the SCU 64 by the bus 66. Reference numeral "73" is an encoder, and reference numeral "75" is an interface for the CDROM.

The first video display processor 68 controls image data of parts, such as the course, car, background and game information. Connected to this processor 68 are the image memory 78 in which a command for image processing and character data originated from the image processing are written by the main CPU 50, and two frame buffers 80 and 82 which store display data to be displayed pixel by pixel. The second video display processor 70 performs control in such a way as to display data, written in the frame buffers 80 and 82, on the display device 12 in accordance with a predetermined priority. An image memory 84 and a color RAM 86 for storing color information are connected to this processor 70.

When the CDROM 75 having stored a program, course parts data and image data of parts associated with a car racing game according to this invention is installed into the main body 10 having the above-described structure, those stored data are loaded into the memory 54 as needed as the game progresses.

The main body 10 executes various kinds of operation controls in synchronism with a system clock of a cycle of 1/60 sec, writes display data into the frame buffers 80 and 82 at a cycle of 1/30 sec which is a half the cycle of the system clock, and draws data in the frame buffers 80 and 82 on the display device 12 once every 1/60 sec. In this example, the same display data written in the frame buffers 80 and 82 are drawn twice on the display device 12.

Although the game program, course parts data and image data of parts are recorded on the CDROM 75 in this example, such memory medium may be a semiconductor memory, magnetic recording medium and magneto-optical recording medium which are properly selected by a person skilled in the art.

Operational Flow of Game

Figure 3:
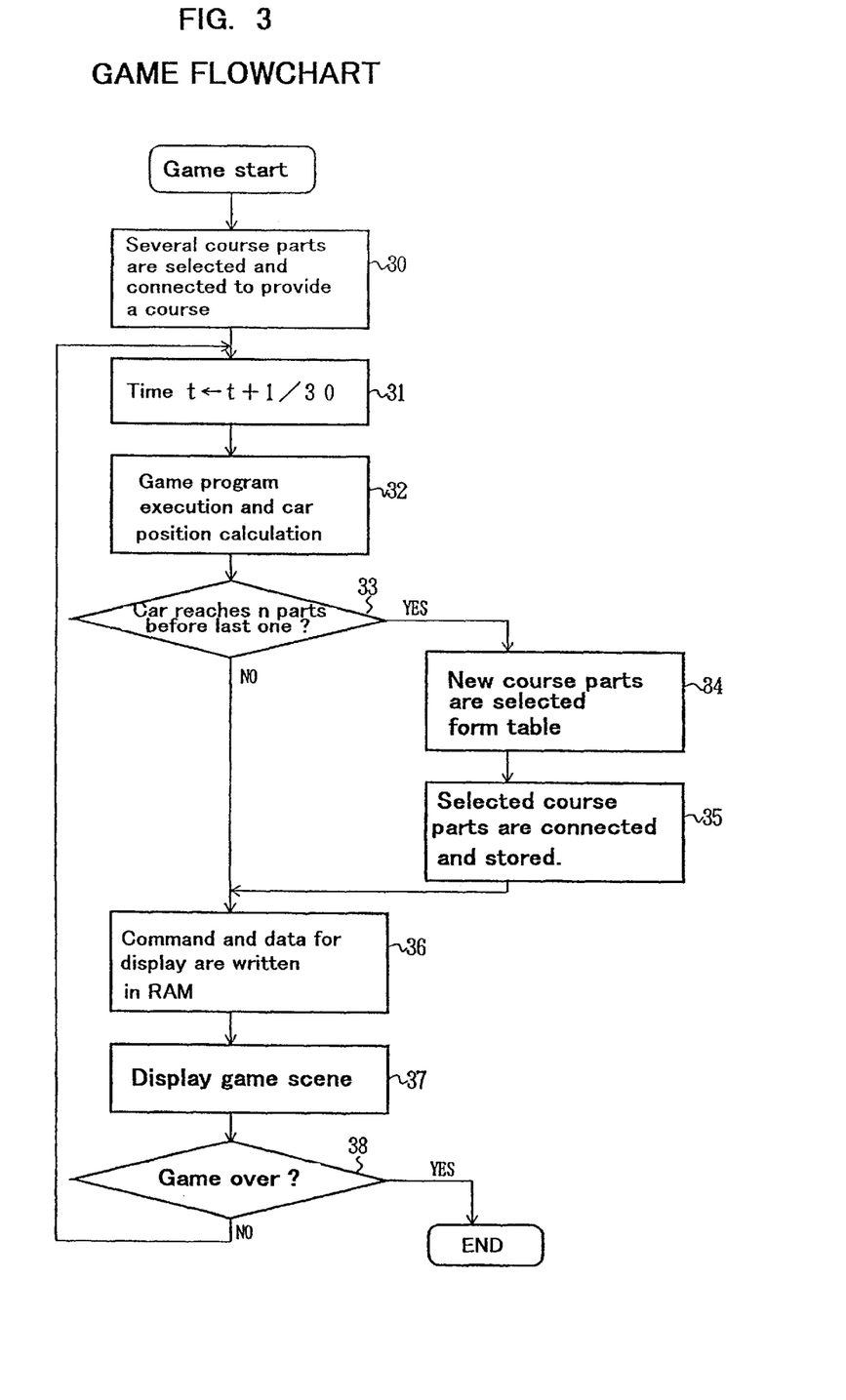
FIG. 3 is an operational flowchart illustrating the action of a driving game.

FIG. 3 presents a flowchart for explaining the operational flow of the car racing game. The following is the general operation of the car racing game according to this invention. First, several pieces of course parts data are selected at random and are connected to prepare course data at the beginning of each game (step 30). The course data which may include various kinds of data should at least have data of the connecting order of selected virtual course parts data. This is because data of the course-parts connecting order can allow the proper course parts data to be read and connected to construct image data. When the course layout is completed by simply connecting several course parts, course data formed by the connection is repeatedly used during a game. This is a case where cars run on a fixed race course repeatedly. The RAM 54 should have a capacity enough to store data prepared by connecting several blocks of course parts data.

For a rally type car racing game, which requires a new and unexpected course layout, not a fixed course, for players to enjoy the game, the CPU 50 performs an operation to sequentially select new course parts and connect the parts to the existing course, which has been formed by several course parts at the beginning of the game, as the game proceeds.

As illustrated in FIG. 3, the time is counted every one thirtieth second (step 31), and the CPU 50 executes the game program in accordance with an input operation signal and compute new positional data from the input operation signal and the current positional data of the car (step 32). The CPU then determines if the car has reached a point of n course parts away from (before) the last course part. When the car has reached that point, the CPU 50 randomly selects the next course part from among course parts data, loaded into the RAM 54 from the CDROM 76, referring to a table to be discussed later (step 34). The selected course part is connected to the end of the course and is stored in the proper area in the RAM 54 (step 35).

With regard to data to be displayed on the screen, which has been acquired by executing the game program, the SCU 64 writes a command and character data to display the game scene into the video RAM 78 (step 36) as mentioned earlier.

Then, the first and second image display processors 68 and 70 supply final display data to the display section 12 to display the game scene (step 37). If the game is not over, the above-discussed operational flow is repeated.

Course Parts And Course Layout

The following specifically describes how plural pieces of course parts data are constructed and how they are connected to form t he whole course.

Figure 4:
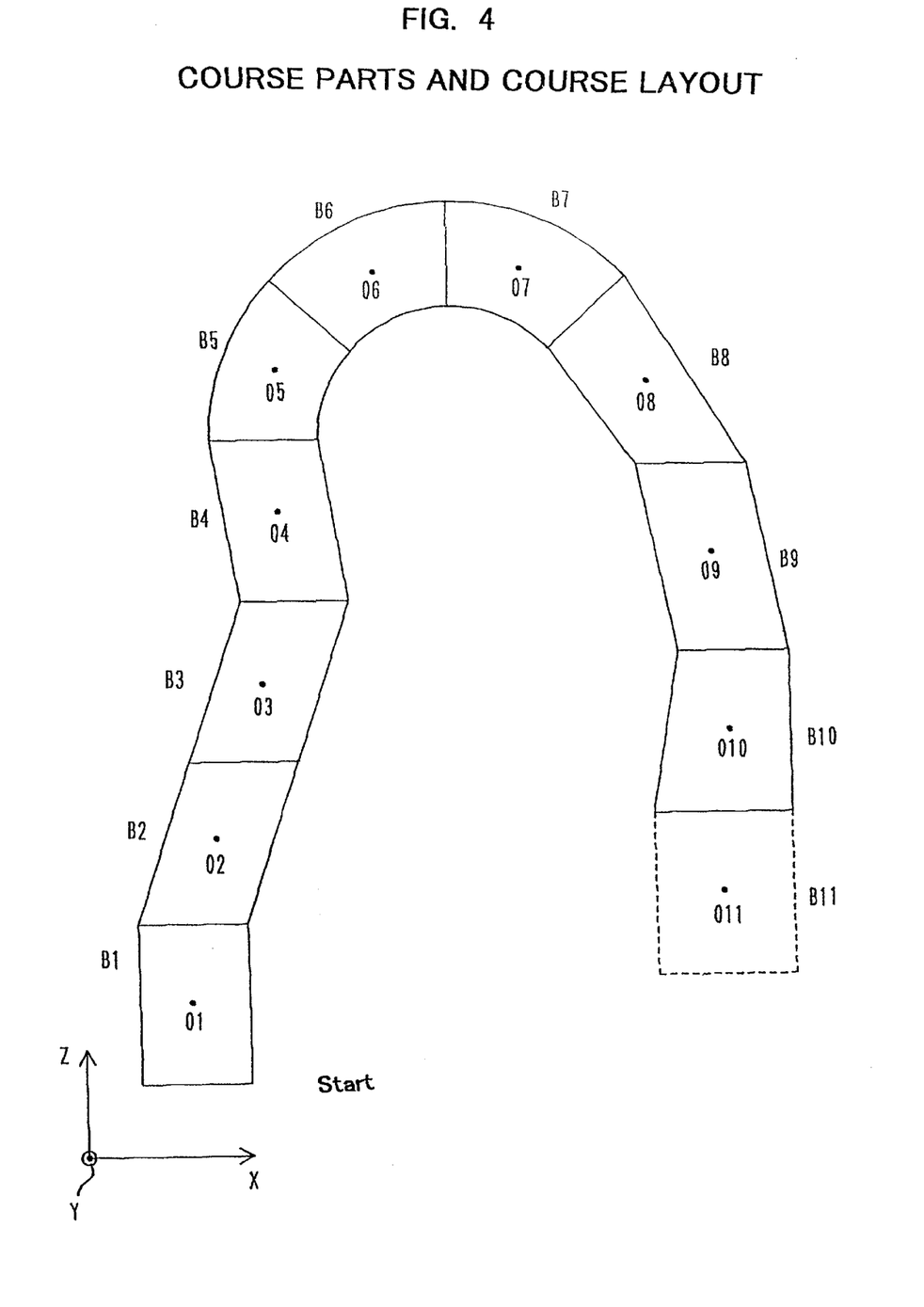
FIG. 4 is a schematic diagram showing course parts and the course layout.

FIG. 4 presents a schematic diagram showing course parts and the course layout. FIG. 4 shows a course constructed by connecting ten course parts B1, B2, . . . , B10 which have been selected and whose connecting order has been decided at the beginning of the game, and a course part B11 which is to be connected to this course. The individual course parts have their center points 01, 02, . . . , 011 defined so that the course parts are located within, for example, the common coordinate space with the X, Y and Z coordinates. Those center points may be defined by relative coordinates instead. In the illustrated example, the X and Z axes are parallel to the drawing sheet, and the Y axis perpendicular to the drawing sheet. The positions of the center points in this common coordinate space are stored in the proper memory area, and the computation of the position of the car and the construction of data of the course layout are performed based on the stored positions. The positional computation and the data construction may be carried out in each coordinate space of each course part. In that case, as the car moves, the coordinate space changes. Note that FIG. 4 merely gives the schematic two-dimensional illustration of the individual course parts.

As mentioned in the foregoing description of the flowchart in FIG. 3, when the car reaches the course part B5, for example, it is detected that the car has come to the point of six course parts away from or before the last course part B10, and the eleventh course part B11 is randomly selected as the next part to the course part B10 and then connected to the course part B10. In this case, if the RAM 54 suffers the limited memory capacity, data of the course parts B1 to B4 the car has already passed are erased.

Figure 5:
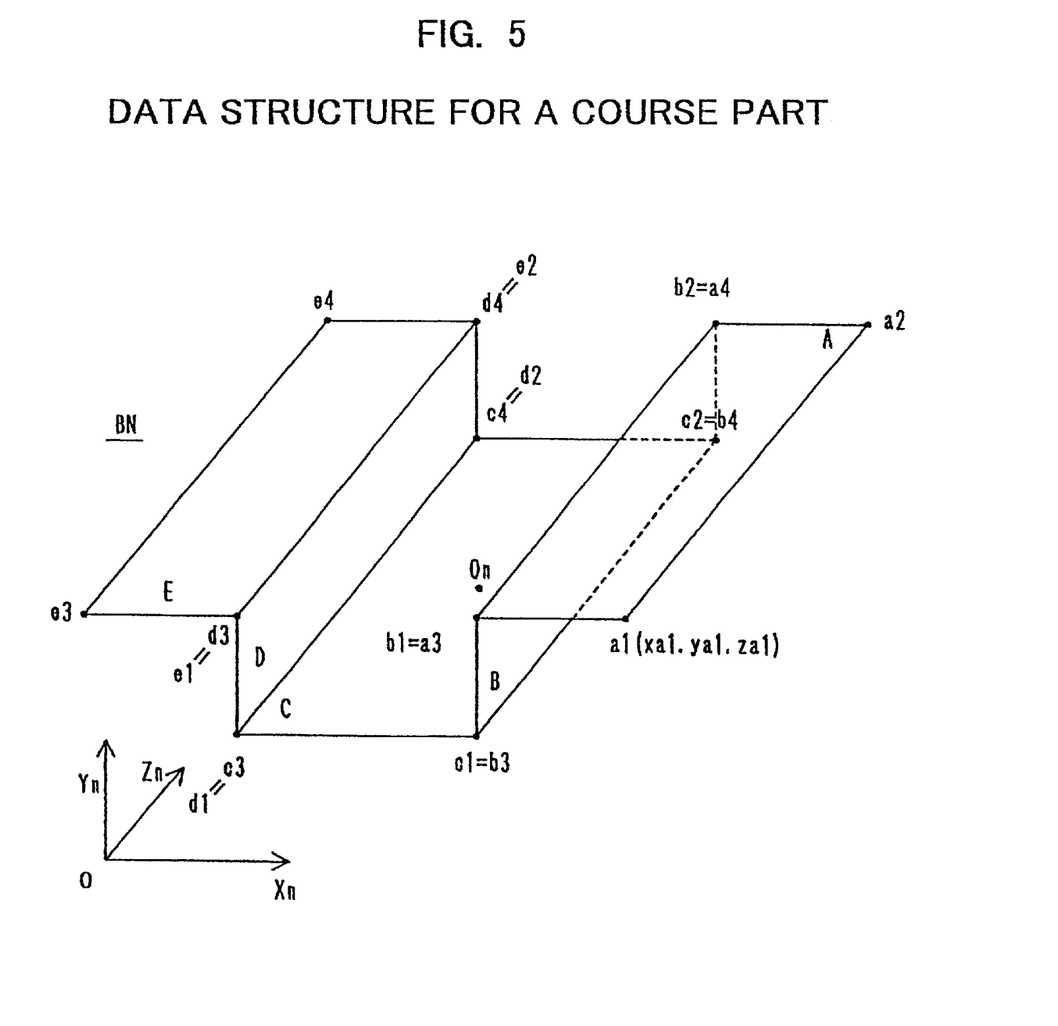
FIG. 5 is a diagram showing the data structure of course parts.

FIG. 5 is a diagram for explaining the data structure of a single course part Bn. As shown on the display screen in FIG. 1, the course 20 comprises the road surface where the car runs, wall portions 26 on both sides of the road and portions 27 located outward of the wall portions 26. The display screen shows the faraway mountains and woods in addition to the course 20.

Returning to FIG. 5, the course part Bn, an element of the course 20, includes, for example, five polygons A, B, C, D and E. The surface C is the road surface portion the car runs, and has a center point On for the course part defined at the center. The surface A is a polygon having four vertexes, a1, a2, a3 and a4, and is previously given with texture data which provides the surface pattern of that surface. The surface pattern may be a rocky surface, a grassy pattern, stands, etc. Likewise, the surface B is a polygon having four vertexes, b1, b2, b3 and b4. The same is true of the surfaces C, D and E.

Those vertexes are defined by the coordinates in the coordinate space of Xn, Yn and Zn in each course part. The center point On is the origin O in the coordinate space, so that the four vertexes of each polygonal surface is defined by relative coordinates from the center point On. As regards the surface A, the coordinates of point a1 are defined as $(x_{a1}, y_{a1}, Z_{a1})$. Therefore, the vertexes of the connecting portions of adjoining polygons are given with the same coordinate data.

Figure 6:
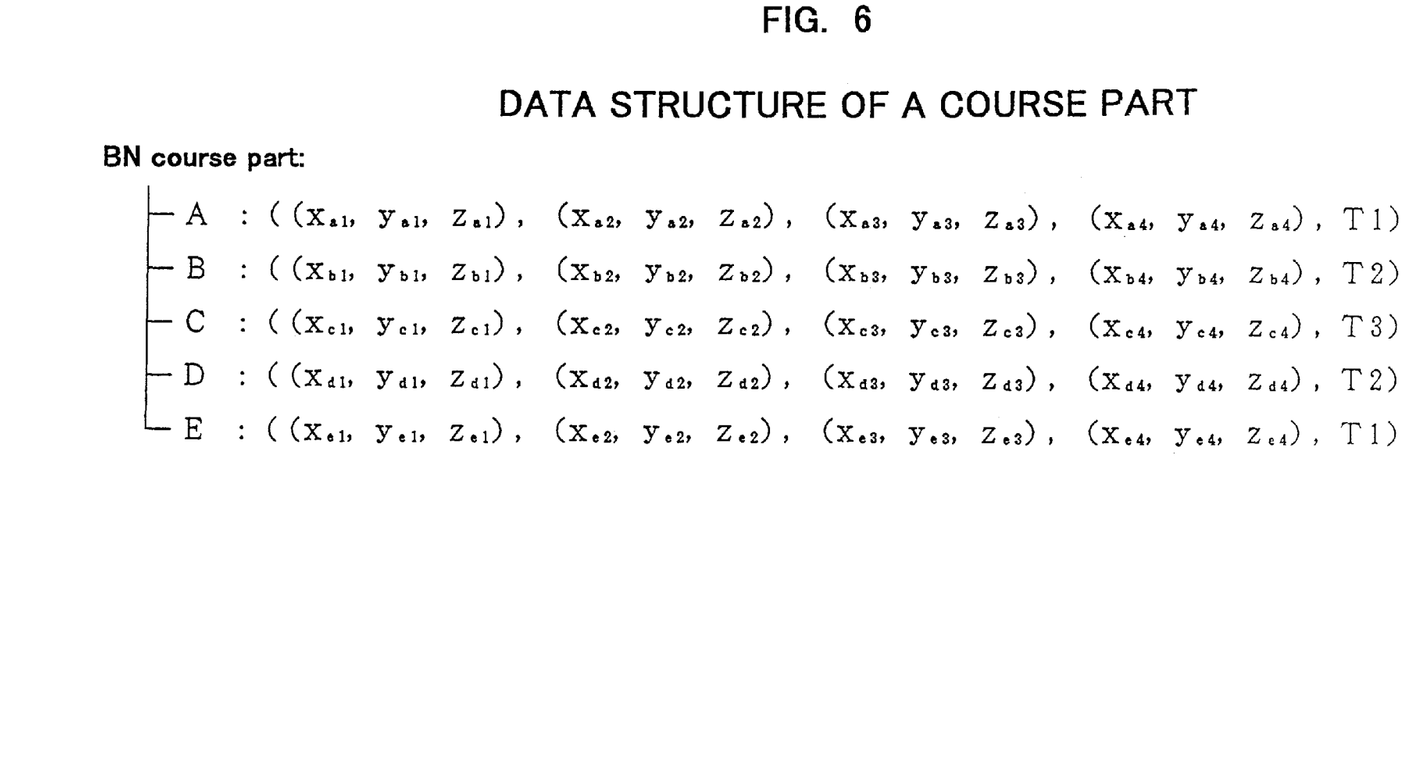
FIG. 6 is a diagram showing the data structure of course parts.

Each course parts data defined in the above manner has the coordinate data of the four vertexes which define each of five polygons and the texture data indicative of the surface pattern. FIG. 6 shows the data structure of the course parts data. The surface of each polygon is constructed by coordinate data and texture data. It is apparent from FIG. 6 that the surfaces A and E are given with the same texture data T1. Likewise, the surfaces B and C are given with the same texture data T2.

Figure 7:
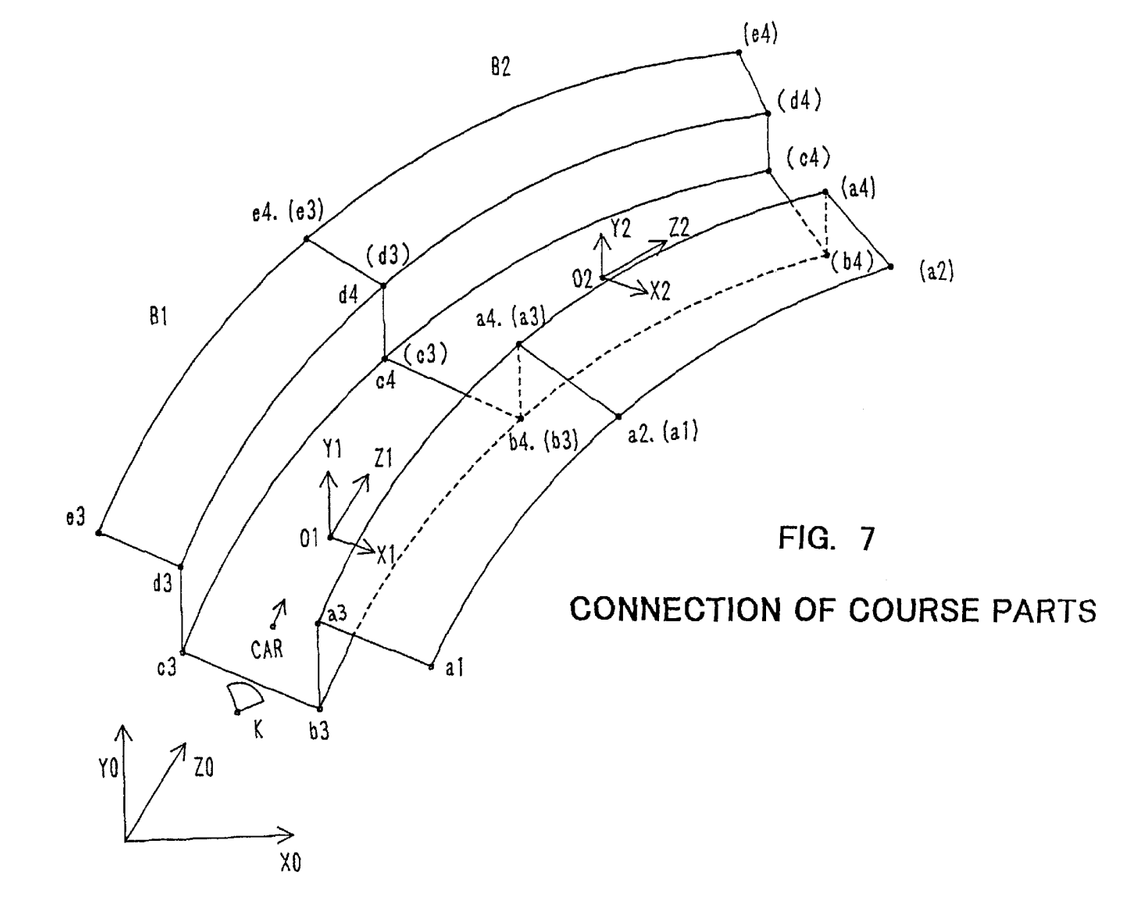
FIG. 7 is a diagram for explaining how to connect course parts.

FIG. 7 is a diagram for explaining how to connect the next course part B2 to the course part B1. The vertexes of the individual polygons of the course part B1 are shows by a1, a2, and so forth, and the vertexes of the individual polygons of the course part B2 are shows by (a1), (a2), and so forth. To connect two course parts, they should have polygons which have identical shapes or complementary shapes, like a recess and a projection, at the connecting portions. In other words, the correlation of the individual vertexes a2, a4, b4, c4, d4 and e4 of the course part B1 should be identical to the correlation of the individual vertexes (a1), (a3), (b3), (c3), (d3) and (e3) of the course part B2. It is also desirable that the texture data of the polygons to be connected at least at the connecting portions should be the same.

Suppose that the running car ("CAR" in FIG. 7) has come inside the course part B1. The coordinates of each vertex point of the course part B1 are defined by the coordinate values in the coordinate space of $X_1$, $Y_1$ and $Z_1$ with the center point O1 of the course part B1 as the origin. The same is true of the course part B2. In connecting the course part B2 to the course part B1, the position of the center point O2 of the course part B2 in the coordinate space of $X_1$, $Y_1$ and $Z_1$ is computed from the individual vertexes of the connecting portions.

Then, the position of a camera which forms the display scene is determined from the position of the car (point CAR) and its running direction (the arrow in FIG. 7). For example, the camera position is determined as a point K in FIG. 7. Each polygon data in the coordinate space of $X_1$, $Y_1$ and $Z_1$ is transformed to two-dimensional data from three-dimensional data in perspective, and display data is then prepared according to the transformed data. Since such conversion of three-dimensional polygon data to two-dimensional one is well known, its description will not be given here.

The position of the car is computed once every 1/30 seconds based on input information, such as the steering direction, acceleration and braking, from the input operation section 11. When the car reaches the next course part B2, the same computation as discussed above is performed for its coordinate space of $X_2$, $Y_2$ and $Z_2$. It is to be noted that the position of the car is computed in such a way as not to pierce the surfaces B and D corresponding to the walls of each course part. Accordingly, the position of the car is so computed as to always remain in the course regardless of the input operational information. If the car hits the wall B or D, the number of collisions is memorized to be used as status data during the game.

In the above-described example, positional computation is performed within the coordinate space of each course part, which is changed as the course part is shifted. Instead, each positional computation may be performed within a fixed absolute coordinate space of $X_0$, $Y_0$ and $Z_0$ common to the individual course parts.

A description will now be given of how to randomly select the individual course parts referring to FIGS. 8 and 9. The expression "randomly select" means random selection under a given restriction or rule, and includes the selection with a predetermined probability set for each course part, which will be discussed below.

Figure 8:
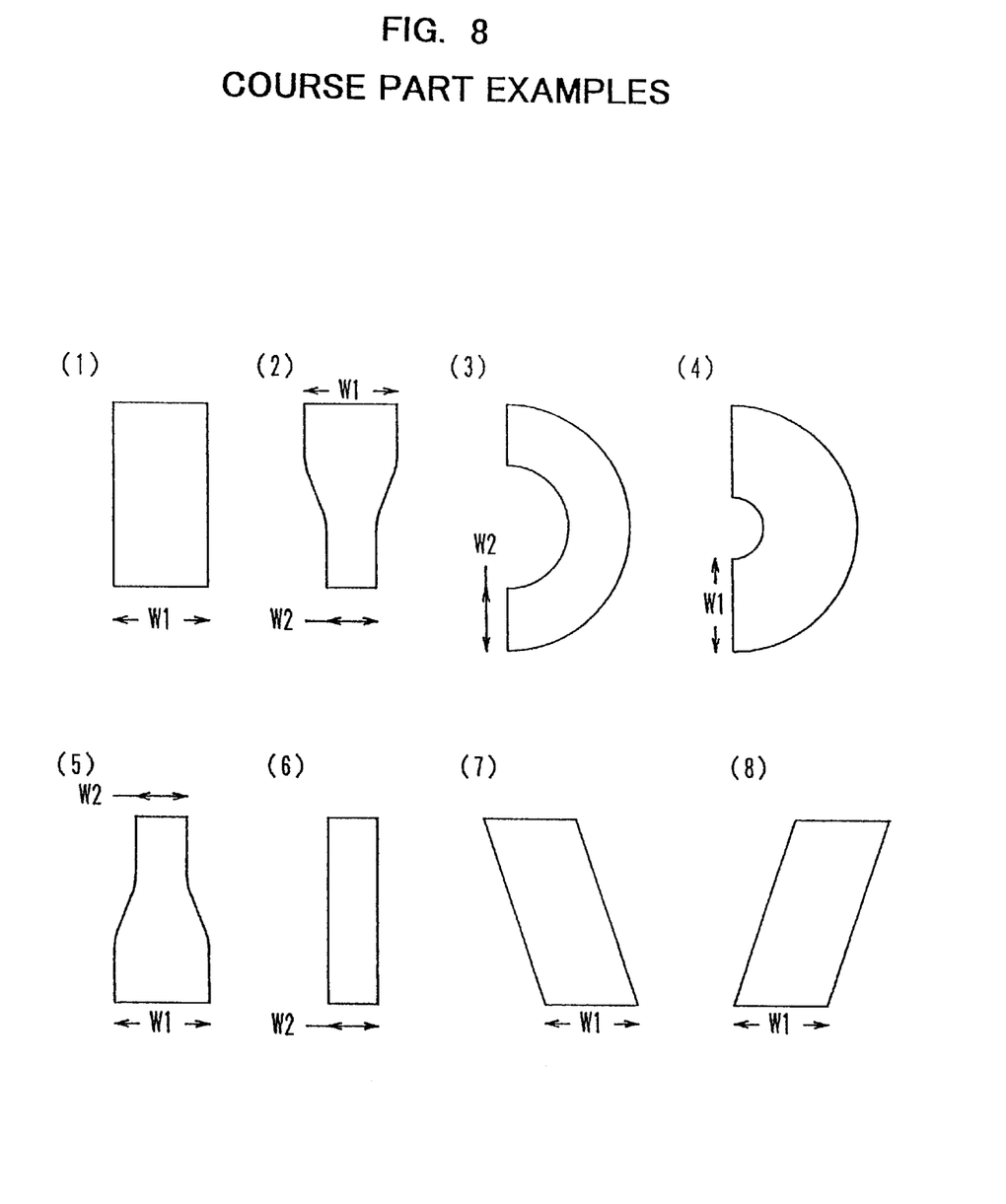
FIG. 8 is a diagram showing examples of course parts.
Figure 9:
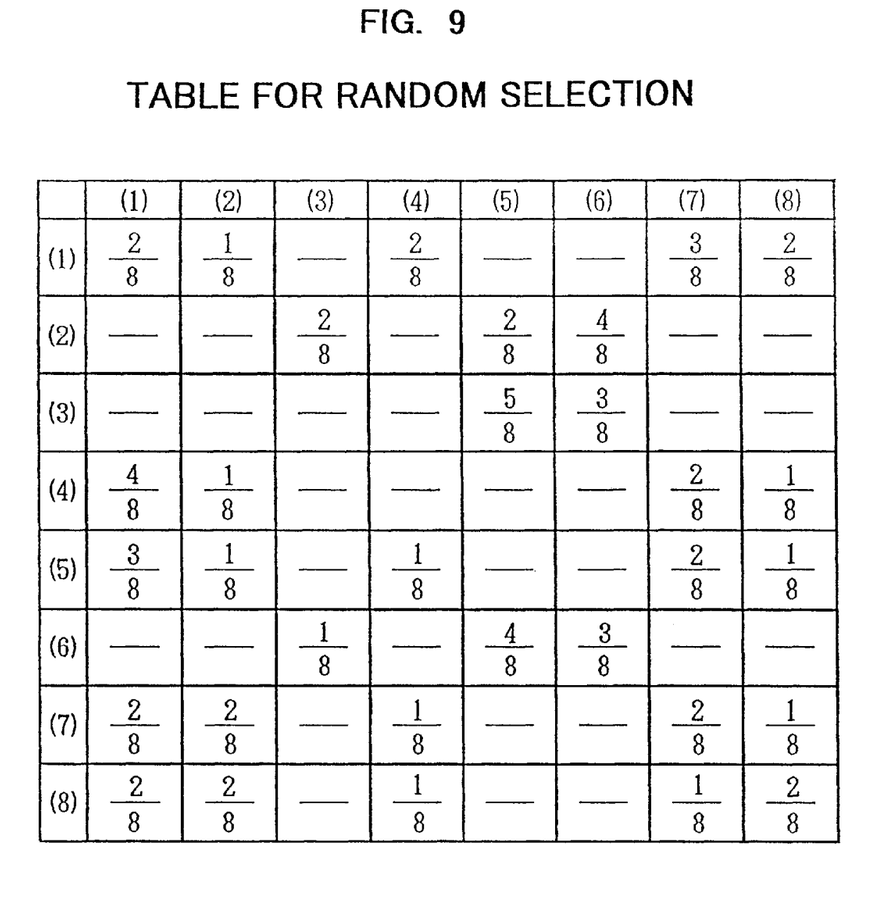
FIG. 9 is a diagram exemplifying a table for randomly selecting course parts data.

FIG. 8 shows examples of course parts. For simplicity, only surfaces C which are road surface portions are shown, and the lower side of each course part is the endmost portion of the course that will be connected to the next course part. The important point in this example is that there are two kinds of widths, W1 and W2, for the connecting sides of the course parts. Therefore, the course parts having the width W1 can be connected to those having the width W1, and cannot be connected to any course part having the width W2 narrower than W1. Although the description has been given with reference only to the width of the surface C for illustrative simplicity, individual course parts can be connected together when their polygons at the connecting portions have identical shapes or mating shapes as has been explained referring to FIGS. 5 and 7.

As the course part in (1) in FIG. 8 has the end width W1, it can be connected to any of the course parts in (2), (4), (7) and (8) having the same width W1. In the random selection, therefore, one of those four connectable course parts is selected at random. With regard to the course parts in (3) and (4) in FIG. 8, each of which has the top width and the end width equal to each other, the connection to itself is prohibited since such a course part connected to itself forms a circle.

Various other rules may be made in accordance with the purpose and properties of the game. With reference to FIG. 9, a description will be given of a table which is used at the time a course part is randomly selected according to the above-given rule. This table vertically shows the numbers of last course parts and horizontally shows the numbers of course parts which are connectable to each last course part, with the probabilities of selection at the intersections. The bars "-" in the table indicate the combinations which are prohibited according to the given rule. Although the probabilities of selection are described in this table as one example, they may be altered in consideration of the games properties to randomly form a course having a certain tendency. Specifically, with the individual course parts data remaining the same, a plurality of tables having different sets of probabilities are stored in the memory so that course layouts with different kinds of properties and different levels of difficulties can be constructed at random.

Course parts data to be connected is selected by the proper means such as a random number table based on the probabilities in the table. The course parts data shown in FIG. 8 and the table in FIG. 9 are stored together with the game program in a storage medium like the CDROM 76, are read into the RAM 54 in the main body 10 when the storage medium is plugged therein and are used in computation during the game.

The course parts data and the table for selecting course parts data may previously be prepared in accordance with the difficulty of the car racing game. This difficulty is settled by the designation by a player at the beginning of the game. Alternatively, as the game proceeds, the difficulty may be increased gradually in accordance with the number of collisions against the right and left walls, the average driving speed, the time needed to drive through several course parts, etc. as the status point of the player. This situation can easily be created by changing the table to another one having a different set of probabilities of connection to form a more difficult course. Various modifications as such are not difficult for those skilled in the art to make.

In short, according to this invention, every time a game is played, the course layout can be changed to give tenser feeling and more excitement to the player than the conventional games which suffer fixed course layouts. Further, each player runs on a new and unexpected course and can thus experience more real drive feeling particularly in a rally-like game. Furthermore, the flexibility of the course layout becomes improved so that players do not get bored with the game and can enjoy playing the game for a long period of time as opposed to the conventional games with fixed course layouts.

The present examples and embodiment are to be considered as illustrative and not restrictive and the invention is not to be limited to the details given herein, but may be modified within the scope of the appended claims.

What I claim is:

1. A virtual course display method of displaying on display means a virtual course, which is constructed by connecting a plurality of virtual course parts and where a virtual mobile body runs, the method comprising the steps of:

randomly selecting a predetermined number of successively connectable virtual course parts data from among plural pieces of virtual course parts data having different shapes and each being connectable to at least one of other virtual course parts data;

storing at least a connecting order of the selected predetermined number of virtual course parts data;

constructing a virtual course including virtual course parts data a mobile body passes and a predetermined number of virtual course parts data following the former virtual course parts data based on the connecting order;

generating an image of the virtual course; and displaying the image of the virtual course on the display means.

2. A Virtualcourse display method according to the claim 1, further comprising a step of:

randomly selecting a virtual course part datum from among a plurality of virtual course parts data connectable to a last virtual course part during execution of a game program when the mobile body manipulatable by a player reaches a point in a virtual course located away from the last virtual course part by a predetermined number of virtual course parts; and connecting the selected virtual course part to the last virtual course part to update the virtual course.

3. A game machine for executing a game program, stored in a storage medium, for driving a virtual mobile body in accordance with an operation signal generated by a player and supplying an image signal to a display section for displaying a game scene, the game machine comprising:

a storage medium storing plural pieces of virtual course parts data having different shapes in such a manner that one virtual course part is connectable to a predetermined number of other virtual course parts in shape; and control means for randomly selecting a predetermined number of virtual course parts data connectable to one another, storing at least a connecting order of the selected predetermined number of virtual course parts data, connecting the selected virtual course parts data based on the connecting order to construct a virtual course, and executing the game program while supplying an image signal for displaying an image of the virtual course to the display section in accordance with the virtual course.

4. A game machine according to the claim 3, wherein: the control means randomly select a virtual course part datum from among a plurality of virtual course parts data connectable to a last virtual course part during execution of the game program when the mobile body manipulatable by the player reaches a point of a predetermined number of virtual course parts away from the last virtual course part in a virtual course, and connect the selected virtual course part to the last virtual course part to update the virtual course.

5. A storage medium having stored a game program for driving a virtual mobile body and connectable to a game machine for executing the game program for driving the virtual mobile body in accordance with an operation signal generated by a player and supplying an image signal to a display section for displaying a game scene, the storage medium including:

plural pieces of virtual course parts data having different shapes in such a manner that one virtual course part is connectable to a predetermined number of other virtual course parts;

a program code for a step of randomly selecting a predetermined number of virtual course parts data connectable to one another;

a program code for a step of storing at least a connecting order of the selected predetermined number of virtual course parts data;

a program code for a step of connecting the selected virtual course parts data based on the connecting order to construct a virtual course; and a program code for a step of executing the game program while displaying an image of the virtual course on the display section in accordance with data of the virtual course.

6. A storage medium according to the claim 5, further including:

a program code for a step of randomly selecting a virtual course part datum from among a plurality of virtual course parts data connectable to a last virtual course part during execution of the game program when the mobile body manipulatable by the player reaches a point of a predetermined number of virtual course parts away from the last virtual course part in a virtual course, and connecting the selected virtual course part to the last virtual course part to update the virtual course.

7. A storage medium according to the claim 6, wherein, each of the virtual course parts data has plural pieces of data of polygons and texture data of surfaces of the polygons, and the polygons of the mutually connectable virtual course parts data at connecting portions have same shapes or complementary shapes and have same texture.

* * * * *